(No Model.)

J. H. PALMER.
MECHANICAL MOVEMENT.

No. 305,530. Patented Sept. 23, 1884.

Attest
William E. McWade
Harry R. Schafer

Inventor
John H. Palmer
By his atty.

UNITED STATES PATENT OFFICE.

JOHN H. PALMER, OF PHILADELPHIA, PENNSYLVANIA.

MECHANICAL MOVEMENT.

SPECIFICATION forming part of Letters Patent No. 305,530, dated September 23, 1884.

Application filed February 20, 1884. (No model.)

*To all whom it may concern:*

Be it known that I, JOHN H. PALMER, of the city and county of Philadelphia, and State of Pennsylvania, have invented an Improvement in Mechanical Movements, of which the following is a specification.

My invention has reference to mechanical movements; and it consists in certain improvements in friction mechanism, whereby reciprocatory motion may be converted into intermittent rotary motion, all of which are fully set forth in the following specification, and shown in the accompanying drawings, which form part thereof.

Figure 1:
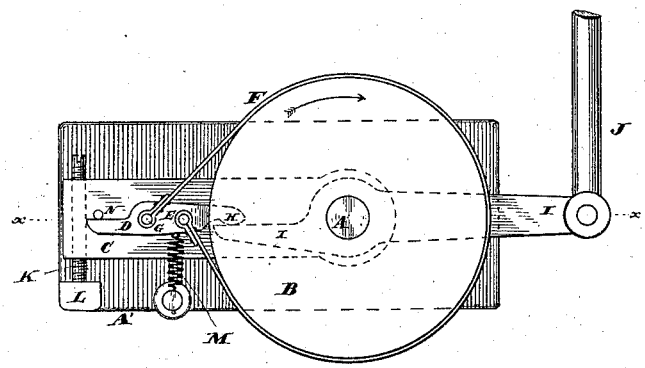
Figure 2:
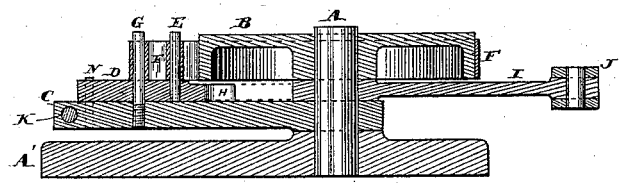

In the drawings, Figure 1 is a plan view of a mechanical movement embodying my improvements. Fig. 2 is a sectional elevation of same on line $x$ $x$.

A is a vertical pin or stud secured to the bed-plate A'. Upon this stud an arm, C, a lever, I, and a band-wheel, B, are pivoted or journaled. The arm C has pivoted to it at G a small lever, D, provided with a pin, E.

N is a pin secured to the arm C, which limits the throw of the lever D upon arm C in one direction. A friction-band, F, encircles the band-wheel B, and has its ends secured to the fulcrum G of the small lever D, and to the pin E secured thereon, so that when said lever is moved in one direction the band is tightened about the wheel B and clamps it, but when moved in the other direction unclamps it. This lever and its arm C are vibrated by a lever, I, actuated by a reciprocating rod, J, which presses against the curved end H of lever D. An adjusting-screw, K, carried by the arm C and working against a lug, L, on bed-plate A', controls the angle through which the wheel B is turned at each vibration of lever I, for if the arm C is held away from stop L a greater distance the movement imparted to the wheel B will be produced only by the lever I after it reaches the end H of lever D.

To keep the lever D always in an unclamping position, except when acted on by lever I, and to return the arm C to the stop L, a spring, M, is secured to the said lever D in such a manner as to keep it pressed against its stop N and the friction-band F loose when unacted upon.

The operation is as follows: As the lever I is vibrated, it presses upon the end H of lever D, which immediately tightens the band F and clamps the wheel B. Then any further movement of lever I moves both arm C and lever F, turning the wheel B also.

If desired, the screw K may be supported by lug L, and the lever I may work against the other end of the lever D, and separate springs may be used for the arm C and lever D, if desired.

While I prefer the construction shown on account of its simplicity, I do not limit myself to the details, as they may be modified in various ways without departing from my invention.

Having now described my invention, what I claim as new, and desire to secure by Letters Patent, is—

1. In a mechanical movement, a band-wheel, in combination with a vibrating arm, a lever carried by said arm, to which the power is applied, and a friction-band encircling the band-wheel, having one end attached to the vibrating arm and the other to the lever, substantially as and for the purpose specified.

2. In a mechanical movement, a band-wheel, in combination with a vibrating arm, means to regulate the vibrations of said arm, a lever carried by said arm, to which the power is applied, and a friction-band encircling the band-wheel, having one end attached to the vibrating arm and the other to the lever, substantially as and for the purpose specified.

3. In a mechanical movement, a band-wheel, in combination with a vibrating arm, a lever carried by said arm, to which the power is applied, a spring arranged to pull said lever always in the same direction, and a friction-band encircling the band-wheel, having one end attached to the vibrating arm and the other to the lever, substantially as and for the purpose specified.

4. The combination of stud A, arm C, lever D, band F, wheel B, and means to vibrate said lever D, substantially as and for the purpose specified.

5. The combination of stud A, arm C, having pin N, lever D, spring M, band F, wheel B, and means to vibrate said lever D, substantially as and for the purpose specified.

6. The combination of stud A, arm C, adjusting-screw K, lever D, band F, wheel B, and means to vibrate said lever D, substantially as and for the purpose specified.

7. The combination of stud A, arm C, having pin N, adjusting-screw K, lever D, spring M, band F, wheel B, and means to vibrate said lever D, substantially as and for the purpose specified.

8. The combination of stud A, arm C, lever D, band F, wheel B, and lever I, pivoted to stud A to vibrate said lever D, substantially as and for the purpose specified.

In testimony of which invention I hereunto set my hand.

JOHN H. PALMER.

Witnesses:
R. M. HUNTER,
FRANCIS S. BROWN.